United States Patent

Baldauf et al.

[11] Patent Number: 5,894,860
[45] Date of Patent: Apr. 20, 1999

[54] PROPORTIONAL PRESSURE CONTROL SOLENOID VALVE

[75] Inventors: Dale Lee Baldauf, Pendleton; Hayse William Warrum, Jr., Indianapolis, both of Ind.; Viswanath Seetharaman, Fairborn, Ohio; Michael Claude Lewman, Muncie, Ind.

[73] Assignee: General Motors Corporation, Detroit, Mich.

[21] Appl. No.: 08/873,831

[22] Filed: Jun. 12, 1997

[51] Int. Cl.$^6$ .................................. F15B 13/044
[52] U.S. Cl. ..................... 137/625.65; 137/596.17; 251/50
[58] Field of Search ............. 137/596.17, 625.65; 251/50

[56] References Cited

U.S. PATENT DOCUMENTS

| | | | |
|---|---|---|---|
| 4,643,225 | 2/1987 | Imhof | 137/596.17 |
| 5,186,093 | 2/1993 | Kervagoret | 137/596.17 X |
| 5,191,827 | 3/1993 | Kervagoret | 91/433 |
| 5,234,030 | 8/1993 | Kervagoret et al. | 137/596.17 |
| 5,571,248 | 11/1996 | Seetharaman et al. | 137/625.65 |
| 5,577,534 | 11/1996 | Ward | 137/625.65 X |
| 5,592,972 | 1/1997 | Niethammer | 137/625.65 |
| 5,640,987 | 6/1997 | Sturman | 137/625.65 X |
| 5,647,645 | 7/1997 | Muller et al. | 137/596.17 X |

FOREIGN PATENT DOCUMENTS

| | | | |
|---|---|---|---|
| 63-208910 | 8/1988 | Japan | 137/625.65 |
| 1-261581 | 10/1989 | Japan | 137/625.65 |

*Primary Examiner*—Gerald A. Michalsky
*Attorney, Agent, or Firm*—Jeffrey A. Sedlar

[57] ABSTRACT

A proportional pressure control solenoid valve includes a valve spool with dual feedback pins slidable relative to the spool within a common bore of the spool as the spool moves. The feedback pins have unequal cross sectional areas defining an operative feedback area and enabling minimization of the valve's size in a cost efficient manner. To control output pressure as a function of control current, an electromagnetically generated force initiates modulation of the valve with assistance from a hydraulic feedback force and in opposition to the force of modulating spring.

5 Claims, 4 Drawing Sheets

PROPORTIONAL PRESSURE CONTROL SOLENOID VALVE

TECHNICAL FIELD

The present invention relates to a proportional pressure control solenoid valve and more particularly, to a proportional pressure control solenoid valve that accurately and repeatably produces an output pressure as a precise function of the applied current signal.

BACKGROUND OF THE INVENTION

Proportional pressure control solenoid valves are used in many mobile and industrial hydraulics applications. In these type of hydraulic solenoid valves, an electromechanical mechanism of the device produces an output force that is a function of the applied current signal. The output force controls the hydraulic mechanism of the device, which throttles hydraulic pressure supplied by a remote source and provides a controlled pressure at the output port of the device. With the widespread utilization of microcomputers on passenger cars and trucks, the ability to apply proportional pressure control solenoid valves to automotive applications has grown. This type of valve is potentially beneficial in controlling fluid flow in automatic transmissions, power steering and braking systems.

A proportional pressure control solenoid valve typically includes a valve spool that is linearly movable in a cylindrical bore formed within a housing. Output or control pressure may be applied to the end of the valve spool through an external conduit or through passages drilled in the housing. When this control pressure is applied to the valve spool, a feedback force that is proportional to the control pressure is generated which opposes the force of a modulating spring positioned on the opposite end of the spool. Feedback area is directly related to spool diameter and is limited by manufacturing restrictions on the valve spool. A magnetic force is typically created by an electromechanical portion of the solenoid. The magnetic force is typically applied in opposition to the force applied by the modulating spring. The magnetic force increases when the current applied to the solenoid is increased. Varying the magnetic force changes the force balance established by the modulating spring and the feedback force, which causes the valve spool to move to re-establish a force equilibrium. Spool movement or "modulation," throttles the inlet pressure and provides a controlled pressure at the output port.

With this type of valve, size, cost and mass are ever-present design factors that are preferably minimized. These factors can be reduced if the magnetic force requirements are reduced. However, the modulating spring force and feedback force are limiting, acting as a boundary restricting the ability to reduce the aforementioned factors. Since the feedback force is proportional to the control pressure and the area of the valve spool, a pressure limitation exists, creating a desire to make the spool as small as possible. The spool's minimum size is restricted by cost and manufacturing limitations. Therefore, proportional pressure control solenoid valves are typically limited to lower pressure applications, since high pressure applications would require excessive efforts to achieve desirable cost and size. Additionally, prior art proportional pressure control solenoid valves may require costly design features or components to provide viscous dampening to control undesirable operating characteristics.

SUMMARY OF THE INVENTION

An aspect of the present invention is therefore, providing a proportional pressure control solenoid valve that overcomes feedback pressure limitations for use in relatively high pressure applications. In achieving this purpose, the present invention embodies a valve spool with dual feedback pins sliding within a bore of the spool as the spool moves. The feedback pins have unequal cross sectional areas minimizing the operative feedback area and enabling minimization of the valve's size in a cost efficient manner. The valve is readily applicable to high pressure and high flow requirement applications. Advantageously, the feedback area of the valve is relatively small and is independent of spool diameter. Therefore, pressure feedback error signal gain is tailored for improved stability.

A preferred aspect of the present invention is embodied in a valve that includes a bore extending completely through the valve spool. This provides balanced pressure across the spool at static conditions. Flow restriction in the bore provides viscous dampening during dynamic operation of the hydraulic mechanism for high hydraulic stability. The dampening can be tuned to a preferred level by tailoring a precision orifice in the bore to the application's operation requirements.

According to a preferred embodiment of the present invention described in greater detail herein, a valve's hydraulic mechanism comprises a housing that carries a valve spool and provides the necessary porting for connection to an associated hydraulic system. The valve spool slides linearly within a cylindrical bore in the housing. A first feedback pin and a second feedback pin each slide linearly within cylindrical bores in the spool. A modulating spring is carried in the housing by a plug and positions the spool in a predetermined initial at-rest position. The hydraulic mechanism provided by the spool is optionally configured as either a normally open or a normally closed device.

As a normally open device, inlet pressure flows through the housing and an annular opening in the spool to a controlled output pressure port when the valve is de-energized. The control pressure is communicated to the end of each of the feedback pins through a common precision orifice. The resultant throttled control pressure establishes an applied force on each of the pins tending to bias the pins apart. The first feedback pin includes an opposite end that is preferably engaged with a guide. The second feedback pin includes an opposite end that is engaged with the plug which is held stationary by being fixed to the housing. The cross sectional area of the first feedback pin is larger than the cross sectional area of the second feedback pin. Therefore, the applied control pressure generates a feedback force on an area of the spool equal to the area differential between the first and second feedback pins. The feedback force is proportional to the control pressure and opposes the force of the modulating spring. The force of the modulating spring biases the spool toward a stop that is provided as part of the guide. A selectively variable magnetic force generated by the electromechanical portion of the valve is applied to the spool in opposition to the force of the modulating spring.

According to a preferred aspect of the present invention, hydraulic leakage to the reservoir is minimized in the de-energized position. With this aspect, the guide is stationary and supports a ball and pin assembly that slides through the guide and provides engagement between the solenoid's push-rod and the spool. The ball is seated by a residual pressure providing fluid-tight closure of the solenoid end of the assembly. The residual static hydraulic seating force is established in the housing by means of internal leakage. The ball cuts off expulsion of leakage control pressure through the guide when the valve is de-energized. Advantageously, the residual pressure is equally applied to both sides of the spool under static conditions due to the bore through the spool.

When the magnetic force exceeds the static hydraulic seating force and the ball is unseated, the residual pressure is exhausted through the guide. Increased magnetic force moves the spool to further compress the modulating spring momentarily blocking the inlet pressure and exhausting the control pressure to reservoir. Therefore, the control pressure will momentarily decrease, and the feedback force will consequently decrease. When the feedback force drops, the modulating spring moves the spool to re-establish equilibrium. Movement of the spool momentarily blocks the reservoir port and re-establishes registry between the input port and the output port. The magnetic force varies as a precise function of the applied current. The changing magnetic force changes the force balance established by the modulating spring and the feedback force causing the valve spool to move to re-establish the force equilibrium. Spool movement or "modulation," throttles the inlet pressure providing a predictable and controlled output pressure as a precise function of the input current.

DESCRIPTION OF THE PREFERRED EMBODIMENT

Figure 1:
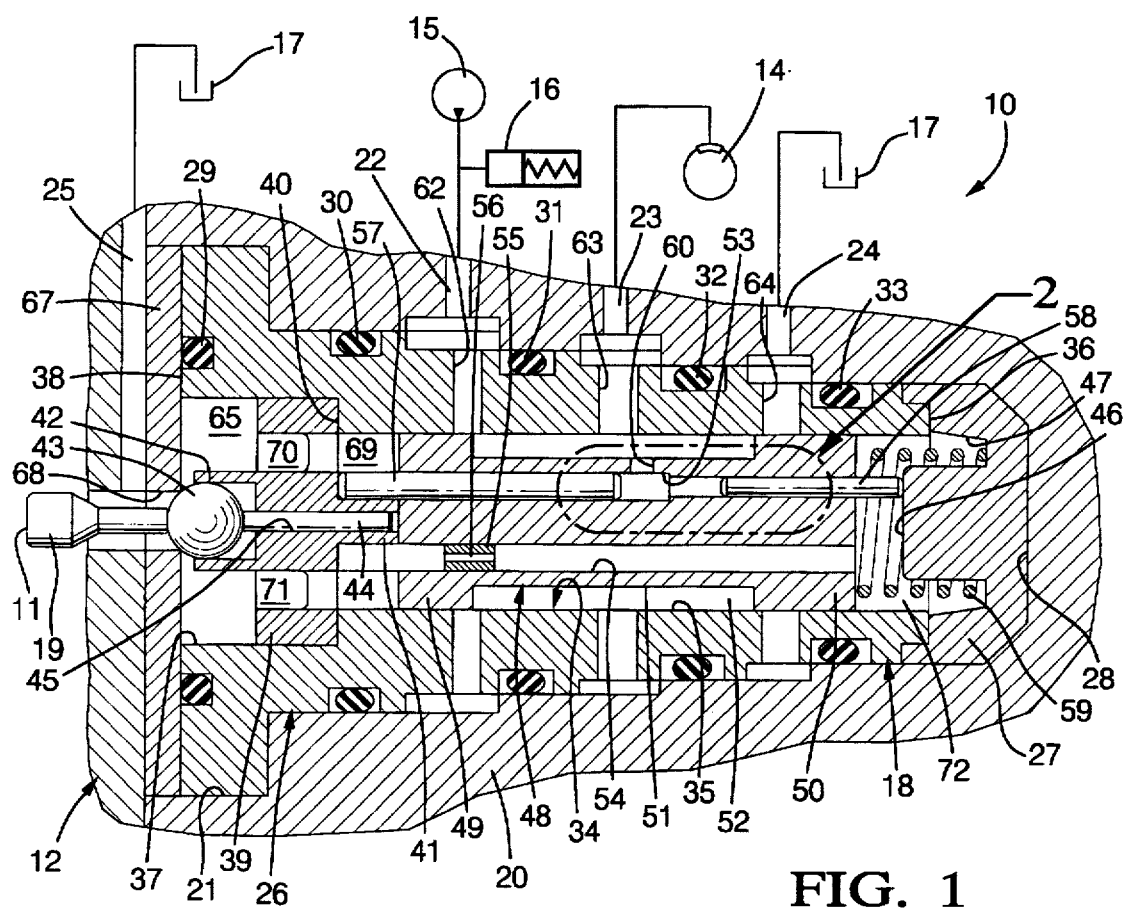
FIG. 1 is a diagrammatic representation, in section, of a proportional pressure control solenoid valve illustrated in a de-energized position and shown in a system according to the present invention.

Referring to the drawings, illustrated in FIG. 1 is a proportional pressure control solenoid valve assembly 12 illustrated diagrammatically, as part of a hydraulic vehicle braking system 10. In addition to the braking system 10, the proportional pressure control solenoid valve assembly 12 is operable in a wide variety of mobile and industrial hydraulics applications wherein output pressure is provided as a precise function of an applied electrical signal. For example, the valve assembly 12 can serve pressure control functions in automotive automatic transmission and power steering systems.

In general, the braking system 10 includes a wheel brake 14 that is actuated in response to the application of hydraulic pressure. Braking system 10 also includes a pump 15 and accumulator 16 for generating and supplying the hydraulic pressure. Additionally, the braking system 10 includes a fluid reservoir 17 that is open to atmospheric pressure. Each of the individually mentioned components of the braking system 10 are interconnected with the valve assembly 12 through typical fluid conduits.

The inventive characteristics of the proportional pressure control solenoid valve assembly 12 are confined to the illustrated aspects of the hydraulic mechanism 18 and actuator assembly 11. It will be appreciated by one skilled in the art that the hydraulic mechanism 18 is associated with an actuator assembly 11, (substantially not illustrated), of which push rod 19 is an integral part. Such an actuator assembly is described in U.S. Pat. No. 5,571,248 which issued Nov. 5, 1996, is commonly assigned, and is specifically incorporated herein by reference. This type of actuator assembly includes an electromagnetic device for generating a force proportional to the electrical current that it is supplied with. The force is applied to the hydraulic mechanism 18 of the valve assembly 12 in a selectively variable manner.

The hydraulic mechanism 18 of the valve assembly 12 is matingly received within modulator 20 which is formed of an acceptably rigid material such as metal. Modulator 20 includes a bore 21 of a succeedingly reducing stepped diameter with a series of ports. The ports include input port 22, output port 23 and reservoir ports 24 and 25, all four of which communicate with the bore 21. In general, through operation of the hydraulic mechanism 18, the pressure supplied by the pump 15 and accumulator 16 through the input port 22 is selectively applied as a control pressure through the output port 23 to the load which, in the present embodiment, is wheel brake 14. The pressure thus applied through the output port 23 is selectively released through the reservoir port 24 to the reservoir 17 to reduce the control pressure at wheel brake 14. Fluid directed to reservoir 17 through the reservoir port 25 is a result of internal leakage due to the nature of the sliding spool type valve.

The hydraulic mechanism 18 includes a stepped, cylindrical shaped body 26 which is machined to mate with the bore 21 in a securely seated manner against the plug 27. Plug 27 is situated in the blind end 28 of bore 21 and can be optionally replaced by providing the end 28 with the plug's physical features. The plug 27 includes annular groove 47 and stop 46. A series of seals 29–33 are situated in grooves located in the body 26 to prevent the cross communication of hydraulic pressure and fluid between the various ports of the hydraulic mechanism 18. The body 26 includes a longitudinal bore 34 that has a first diameter section 35 opening through end 36 of body 26 and a larger, second diameter section 37 opening through end 38 of body 26.

A stationary guide 39 is positioned in the second diameter section 37 against annular wall 40 of body 26. The guide 39 is generally cylindrical and bears radially outwardly against the body 26 in second diameter section 37. Guide 39 includes a tubular extension 41 which operates as a stop and a tubular extension 42 which receives ball 43 and operates as a ball guide. The ball 43 is longitudinally slidable within the tubular extension 42 and a pin 44 is longitudinally slidable within the bore 45 which is formed by the tubular extension 41 and by the main body of guide 39.

The portion of the bore 34 between tubular extension 41 and the stop 46 contains valve spool 48 which is longitudinally slidable within the first diameter section 35 of bore 34. The valve spool 48 includes lands 49 and 50 which are sized to provide a close sliding fit within the first diameter section 35. An undercut segment 51 is formed between the lands 49 and 50 forming an annular chamber 52 within the bore 34. The valve spool 50 includes a longitudinally stepped bore 53 and a straight sided bore 54, each of which extends completely through the valve spool 50. Bore 54 carries a plug 55 that forms a precision orifice 56. This provides an optional controlled restriction to fluid flow through the bore 54. The bore 53 carries a pair of pins 57 and 58 with the pin 57 positioned against guide 39 and the pin 58 positioned against stop 46. The valve spool 50 is slidable within the bore 34 between the tubular extension 41 and the stop 46 with the pins 57 and 58 remaining stationary as the valve spool 50 slides.

A spring 59 is seated in annular groove 47 of plug 27 and engages the valve spool 50 biasing it toward the tubular extension 41. The valve spool 50 includes a cross-hole 60 providing an opening in the form of a precision orifice between the annular chamber 52 and the bore 53. The body 26 includes: a cross-bore 62 providing an opening between the bore 34 and the input port 22, a cross-bore 63 providing an opening between the bore 34 and the output port 23 and a cross-bore 64 providing an opening between the bore 34 and the reservoir port 24.

In addition to the annular chamber 52, at least three other chambers are formed within the bore 34. Chamber 65 is formed in the second section 37 adjacent the guide 39 and substantially about the tubular extension 42. The chamber 65 is substantially closed by plate 67 which is received within bore 21 and includes a central opening 68. The chamber 65 communicates with the reservoir port 25 through the central opening 68. Chamber 69 is formed between the guide 39 and the valve spool 48. Any hydraulic fluid pressure in chamber 69 is substantially equal to the fluid pressure in chamber 65 due to the openings 70 and 71 provided through the guide 39. Chamber 72 is formed between the valve spool 48 and the plug 27 and carries fluid pressure that substantially leaks between the land 50 and the wall of body 26 at bore section 35. During operation of the hydraulic mechanism 18 the fluid pressure in chamber 72 will be somewhat higher than the fluid pressure in chamber 69 due to the flow restriction provided by the precision orifice 56 or optionally by the sizing of bore 54.

Figure 2:
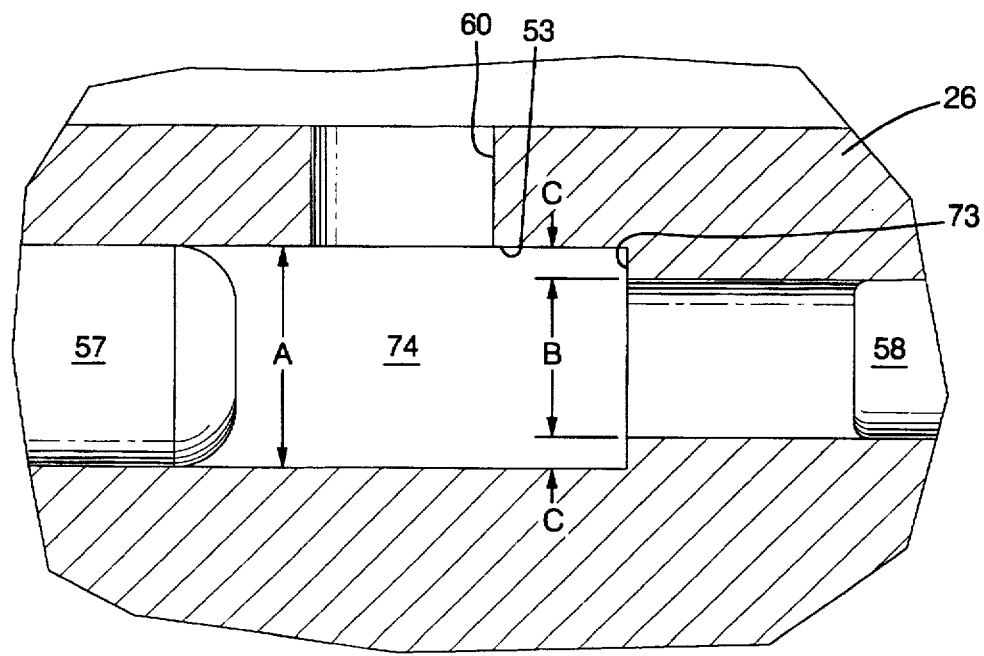
FIG. 2 is an enlarged detail illustration of a portion of FIG. 1.

Referring to FIG. 2, the feedback area of the hydraulic mechanism 18 is indicated by the area C at annular wall 73 of the valve body 26. The area C is equal to the differential between the area A of the cross-section of pin 57 and the area B of the cross-section of pin 58. Hydraulic fluid pressure in the chamber 74 of the bore 73 acts equally on all surfaces therein. The longitudinally directed forces which tend to affect movement of the valve spool 48 within the bore 34 are applied to offsetting areas on the left half and the right half of the cross-hole 60. These forces are also applied to the area A of the pin 57, the area B of the pin 58 and the area C of the annular wall 73. Since the pin 57 is fixed against movement to the left (as viewed in FIG. 1), by engagement with the guide 39, and the pin 58 is fixed against movement to the right (as viewed in FIG. 1), by engagement with the stop 46, fluid pressure acting on the area C of the annular wall 73 will tend to push the spool 48 toward the stop 46. This application of pressure on area C results in the feedback force.

The feedback force exerted by the hydraulic pressure in the chamber 74 against the annular wall 73 opposes the biasing force of the modulating spring 59. The hydraulic pressure in chamber 74 varies in proportion to the control pressure which is present in the annular chamber 52 during operation of the hydraulic mechanism 18 as the lands 49, 50 variably close bore 34 off from the input port 22 and open bore 34 to the reservoir port 24. For operation of the hydraulic mechanism 18, the modulating spring force 59 must always be greater than the feedback force generated against the annular wall 73. In manufacturing the valve assembly 12, the feedback area C is minimized by minimizing the difference between the areas A and B in a manner that is much more readily produced than would be the case with a single pin wherein a very small pin would have to be precision formed. Minimizing the feedback force means that the strength of the modulating spring 59 may be minimized which in turn means that the valve assembly 12 will work with less force introduced from the associated electromagnetic actuator. This results in an acceptably sized valve for high pressure applications.

Figure 3:
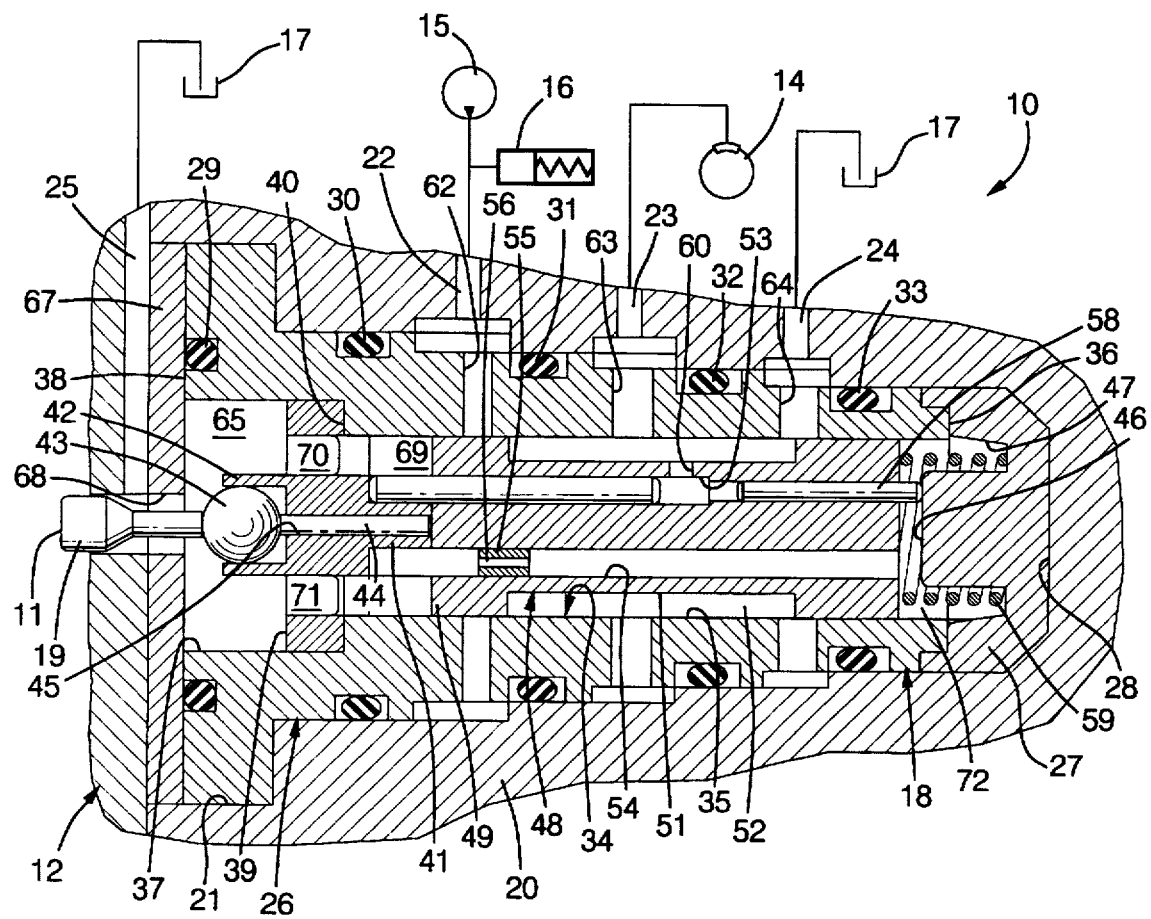
FIG. 3 is a diagrammatic representation of the system of FIG. 1 with the valve illustrated in an energized position.

Referring to FIG. 3, the valve assembly 12 is shown in an energized state. In order to actuate the valve assembly 12, an electromagnetic force is introduced through the push rod 19 to the ball 43. The ball 43 is unseated from the central opening 68 and has slid to the right within the tubular extension 42 of the guide 39. In response, the pin 44 is forced to the right and effects movement of the valve spool 48 to the right. This closes the annular chamber 52 off from the input port 22 and opens the annular chamber 52 to the reservoir port 24. The output port 23 remains in continuous communication with the annular chamber 52. As the valve spool 48 slides to the right, the pins 57 and 58 remain stationary relative thereto, and the modulating spring 59 is compressed by a combination of the feedback force and the electromagnetic force.

The hydraulic mechanism 18 of the valve assembly 12 is provided as a normally open device wherein the input port 22 normally communicates with the output port 23 through the valve body 26. As a normally open device, inlet pressure normally flows through the hydraulic mechanism 18 from the pump 15 and accumulator 16 to the load at wheel brake 14. As shown in FIG. 1, the reservoir ports 24 and 25 are normally blocked by the valve lands 50 and 49, with only a small amount of leakage fluid past the lands exiting the hydraulic mechanism 18 to the reservoir 17. The pressure available in annular chamber 52 is provided to the chamber 74 for generating the feedback force through the cross-hole 60 which is provided as a precision orifice.

When the valve spool 48 is moved to the right as shown in FIG. 3, momentarily blocking inlet pressure through the input port 22, the control pressure will decrease momentarily and the feedback force will also decrease momentarily in proportion thereto. The modulating spring 59 operates to reestablish a force equilibrium on the valve spool 48 by moving it to the left momentarily blocking the reservoir port 24 and opening the input port 22 as a result. By changing the magnetic force applied through the push rod 19 as a function of input current, the force balance is selectively changed to effect the rate at which the force equilibrium modulation occurs, providing a selected amount of output pressure that is transferred from the input port 22 to the output port 23. The movement of valve spool 48 throttles the inlet pressure and provides a predictable and controlled pressure at the output port 23 which is a precise function of the input current.

In the deenergized position of FIG. 1, the hydraulic mechanism 18 is provided with zero leakage to the reservoir through the central opening 68 of the plate 67. The modulating spring 59, through the interposed valve spool 48 and pin 44, forces the ball 43 into a seated position within the central opening 68 closing off the reservoir port 25 from the chamber 65. The pressure in the chamber 65 creates the static sealing force due to fluid pressure leakage past the valve spool 48 from the input port 22, which tends to hold the ball 43 in a seated position. In static conditions, the pressure in chambers 69 and 72 is equal due to the opening provided through the bore 54. Therefore, in order to initiate modulation of the valve spool 48, the electromagnetic actuator must overcome the sum of the static sealing force and the force differential between the modulating spring 59 and the feedback force.

Figure 4:
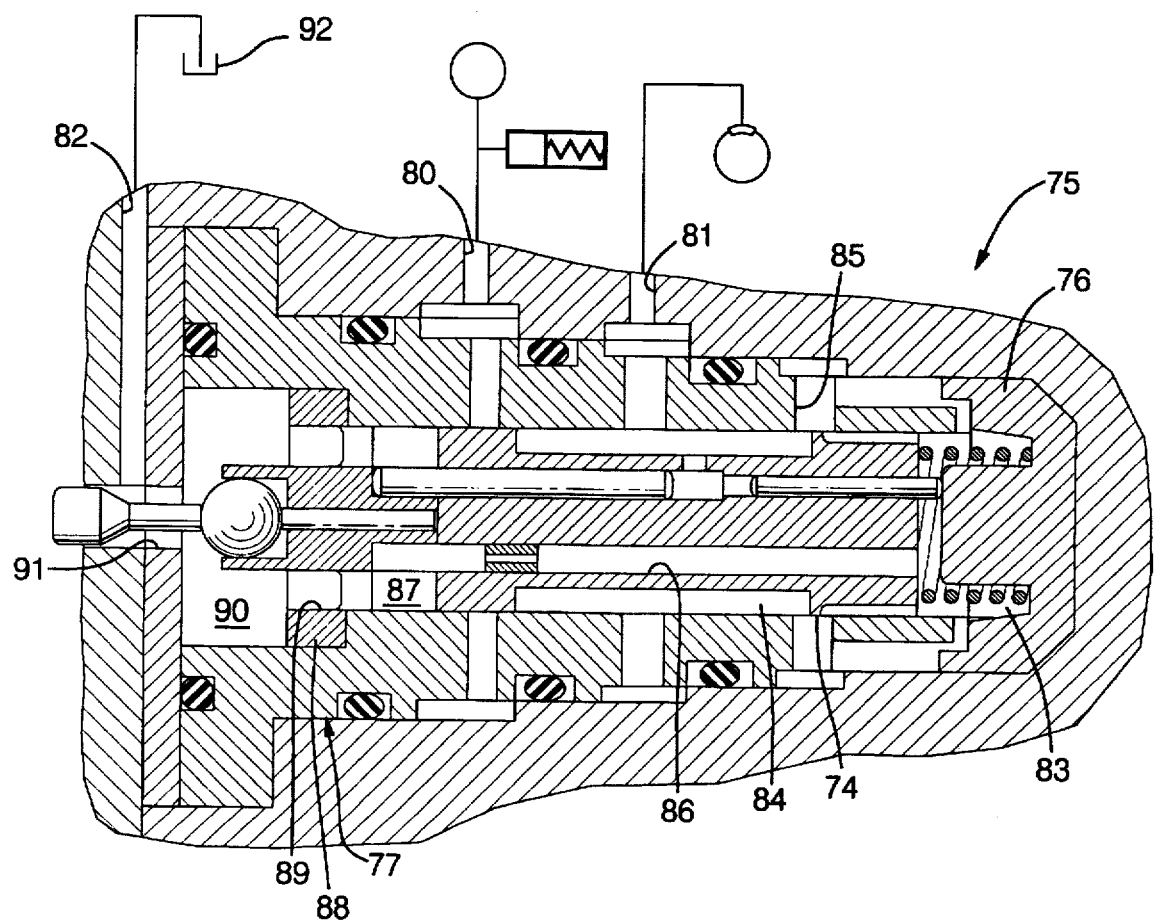
FIG. 4 is a proportional pressure control solenoid valve illustrated in an energized position according to an alternate embodiment of the present invention.

Referring to FIG. 4, an alternative embodiment of the present invention is illustrated as proportional pressure control solenoid valve assembly 77 and is shown in an energized position within braking system 75. Valve assembly 77 operates similarly to valve assembly 12 of FIG. 1 and includes the additional advantage of essentially no parasitic leakage loss when the valve is deenergized, corresponding to an application of operating pressure 30 to the output port 81. Accordingly, the valve assembly 77 is particularly useful in closed hydraulic systems and operates at low energy consumption rates. Like the valve assembly 12, the valve assembly 77 includes a central opening 91 that is completely closed off when deenergized to prevent the flow of fluid from chamber 90 to reservoir 92. Any fluid leakage from the input port 80, past the valve spool is maintained in the valve assembly 77 since the only connection to the reservoir 92 is through the reservoir port 82 and the central port 91.

To enable elimination of a separate reservoir port as used in valve assembly 12 of FIG. 1 to release exhaust fluid from the output port 81 to the reservoir 92, fluid is routed through the central opening 91. More specifically, fluid flow from the output port 81 to the reservoir 92 is routed through annular chamber 84, around land 74 through cross-bore 85, chamber 83, channel 86, chamber 87, opening 89 of guide 88, chamber 90, central opening 91 and reservoir port 82. When the valve is de-energized, central opening 91 is closed blocking all flow to the reservoir 92.

Figure 5:
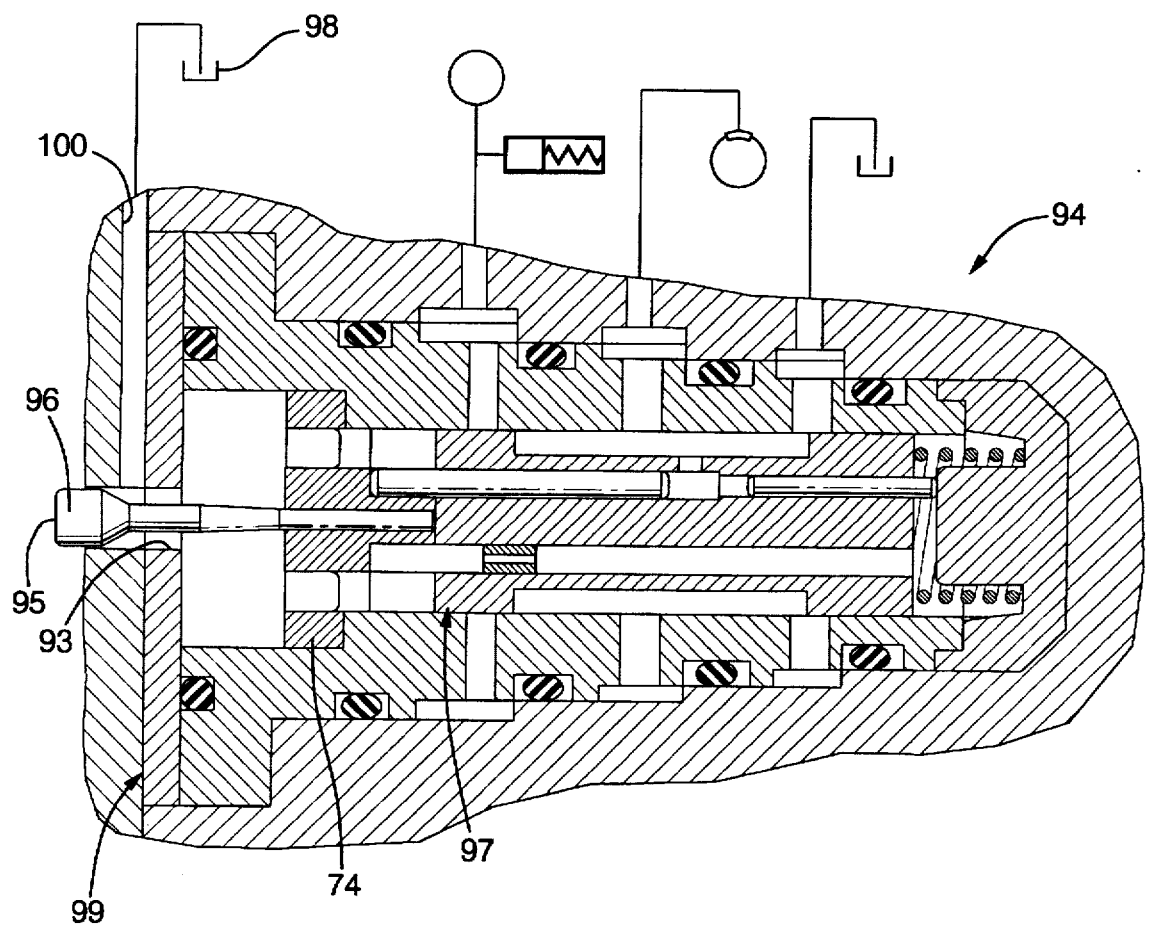
FIG. 5 is a proportional pressure control solenoid valve illustrated in an energized position according to an alternate embodiment of the present invention.

Referring to FIG. 5, another alternative embodiment of the present invention is illustrated as proportional pressure control solenoid valve assembly 99 and is shown in an energized position within braking system 94.

Valve assembly 99 operates similarly to valve assembly 12 of FIG. 1 and is advantageously useful in high pressure open center hydraulic systems with high valve stability requirements. In the valve assembly 99, the central opening 93 remains continuously open to the reservoir 98 through the reservoir port 100. The actuator assembly 95 includes a push rod 96 that directly engages the valve spool 97 through the guide 74. No ball is used for closing the central opening 93.

The present invention provides a proportional pressure control solenoid valve 12 that includes a valve spool 48 with dual feedback pins 57, 58 sliding within bore 53 of the spool to overcome feedback pressure limitations for high pressure applications. The feedback pins 57, 58 have unequal cross sectional areas minimizing the operative feedback area and enabling minimization of the valve's size in a cost efficient manner. The precision orifice 56 provided within the bore 54 provides the advantage of dampening the pressure feedback error signal, which improves stability of the hydraulic mechanism 18. This provides a relatively simple and cost effective means of viscous dampening in the valve spool 48.

We claim:

1. A proportional pressure control solenoid valve comprising:

a valve body having a longitudinal bore; and a valve spool slidably positioned in the valve body and separating the longitudinal bore into a first chamber, an annular chamber, and a second chamber, wherein the valve body includes an input cross bore selectively communicating with the annular chamber and an output cross bore continuously communicating with the annular chamber, and wherein the valve spool includes a stepped bore extending completely through the valve spool between the first and second chambers, wherein first and second segments carrying a first pin having a first diameter and a second pin having a second diameter that is unequal to the first diameter, wherein the valve spool slides in the longitudinal bore relative to the first and second pins with an annular wall formed by the valve spool at a juncture between the first and second segments wherein a feedback force is applied to the annular wall by a hydraulic pressure communicated from the annular chamber to the stepped bore through a cross hole in the valve spool wherein the valve spool includes a balancing bore extending completely through the valve spool between the first chamber and the second chamber and further comprising a guide positioned in the longitudinal bore wherein the guide is engageable by the valve spool to limit sliding thereof, wherein the first pin is engageable with the guide and wherein the guide includes a first tubular extension with a reduced diameter that engages the valve spool.

2. A proportional pressure control solenoid valve according to claim 1 wherein the guide is generally cylindrical, includes a plurality of fluid openings, and is stationary relative to the valve body with the first tubular extension extending toward the valve spool and having a second tubular extension extending away from the valve spool wherein the first pin engages the guide adjacent the first tubular extension further comprising a plate positioned adjacent the valve body and substantially closing the longitudinal bore, wherein the plate includes a central opening and further comprising a ball carried in the second tubular extension of the guide wherein the ball is biased into the central opening to completely close the longitudinal bore at the plate when the proportional pressure control solenoid valve is de-energized and wherein a slidable pin extends through the guide and is engageable with the ball and the valve spool.

3. A proportional pressure control solenoid valve according to claim 1 further comprising a plate that substantially closes off the valve bore and includes a central opening and further comprising a ball seatable in the central opening wherein the first chamber is open to a reservoir port through the central opening when the ball is forced into a second tubular extension by the actuator and wherein the first chamber is closed off from the reservoir port when the ball is seated in the central opening.

4. A proportional pressure control solenoid valve according to claim 3 further comprising an actuator pin slidably carried by the guide and extending between the ball and the spool.

5. A proportional pressure control solenoid valve according to claim 1 wherein the balancing bore includes a precision orifice tuned to provide viscous dampening during modulation of the spool.

* * * * *